United States Patent
Iwasaki

(10) Patent No.: US 11,136,026 B2
(45) Date of Patent: Oct. 5, 2021

(54) VEHICLE CONTROL DEVICE

(71) Applicant: HONDA MOTOR CO., LTD., Tokyo (JP)

(72) Inventor: Shun Iwasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 76 days.

(21) Appl. No.: 16/811,348

(22) Filed: Mar. 6, 2020

(65) Prior Publication Data

US 2020/0282986 A1 Sep. 10, 2020

(30) Foreign Application Priority Data

Mar. 7, 2019 (JP) .............................. JP2019-041301

(51) Int. Cl.
| | |
|---|---|
| *B60W 30/095* | (2012.01) |
| *G06K 9/00* | (2006.01) |
| *B60W 30/16* | (2020.01) |
| *B60W 30/09* | (2012.01) |
| *B60W 60/00* | (2020.01) |

(52) U.S. Cl.
CPC ........ *B60W 30/0956* (2013.01); *B60W 30/09* (2013.01); *B60W 30/162* (2013.01); *B60W 60/00276* (2020.02); *G06K 9/00805* (2013.01)

(58) Field of Classification Search
CPC .. B60W 30/08; B60W 30/09; B60W 30/0956; B60W 2554/80; B60W 30/095; B60W 30/0953; B60W 50/0097; B60W 60/00276; B60T 7/12; G06K 9/00805; G06K 9/6215
See application file for complete search history.

(56) References Cited

U.S. PATENT DOCUMENTS

| | | | |
|---|---|---|---|
| 2015/0039156 A1* | 2/2015 | Shibata | B60W 30/0953 701/1 |
| 2017/0101102 A1* | 4/2017 | Matei | G08G 1/00 |
| 2017/0341642 A1* | 11/2017 | Suzuki | G08G 1/166 |
| 2019/0276028 A1* | 9/2019 | Toda | B60W 60/00272 |
| 2019/0283757 A1* | 9/2019 | Honda | B60W 30/165 |
| 2019/0286149 A1* | 9/2019 | Miura | G01C 21/3415 |
| 2020/0148262 A1* | 5/2020 | Loos | B62D 15/0265 |
| 2020/0255029 A1* | 8/2020 | Matsunaga | B60W 30/09 |
| 2020/0385020 A1* | 12/2020 | Komuro | B60W 60/00272 |

FOREIGN PATENT DOCUMENTS

| | | | |
|---|---|---|---|
| WO | 2015/198426 A1 | 12/2015 | |
| WO | WO-2020148561 A1 * | 7/2020 | B60W 30/08 |

* cited by examiner

*Primary Examiner* — Ryan Rink
(74) *Attorney, Agent, or Firm* — Carrier Blackman & Associates, P.C.; Joseph P. Carrier; William D. Blackman

(57) ABSTRACT

In the case an external environment recognition unit recognizes that an obstacle that hinders traveling of an oncoming vehicle exists in an oncoming lane at a more forward position in a direction of progress than a host vehicle, and also recognizes that a preceding vehicle exists at a more forward position in the direction of progress than the obstacle, and further, in the case that a behavior determination unit determines that the preceding vehicle stops within a predetermined distance (first predetermined distance) from the obstacle, the operation determination unit causes the host vehicle to stop in front of the obstacle.

11 Claims, 8 Drawing Sheets

VEHICLE CONTROL DEVICE

CROSS-REFERENCE TO RELATED APPLICATION

This application is based upon and claims the benefit of priority from Japanese Patent Application No. 2019-041301 filed on Mar. 7, 2019, the contents of which are incorporated herein by reference.

BACKGROUND OF THE INVENTION

Field of the Invention

The present invention relates to a vehicle control device which is capable of automatically performing at least one of a driving force output control, a braking control, and a steering control of a host vehicle.

Description of the Related Art

When a host vehicle (driver's own vehicle) travels in a host vehicle lane, there may be cases in which an oncoming vehicle is forced out into the host vehicle lane in order to avoid an obstacle that exists in the oncoming lane. In such a situation, there is a concern that the host vehicle and the oncoming vehicle may come into contact with each other. In International Publication No. WO 2015/198426, a vehicle control device is disclosed that prevents a host vehicle and an oncoming vehicle (moving object) from passing one another at a position where an obstacle (stationary object) exists. In accordance with such a vehicle control device, since the host vehicle and the oncoming vehicle do not pass by one another at the position of the obstacle, it is possible to prevent contact from occurring between the vehicles due to the obstacle.

SUMMARY OF THE INVENTION

According to the vehicle control device disclosed in International Publication No. WO 2015/198426, even if an obstacle is present in an oncoming lane, if the oncoming vehicle is not currently traveling, the host vehicle is capable of traveling beside the obstacle. However, even in such a case, the host vehicle may temporarily come to a stop in the vicinity of the obstacle due to traffic congestion or the like. At this time, when the oncoming vehicle reaches the position of the obstacle and tries to pass between the host vehicle and the obstacle, the oncoming vehicle and the host vehicle approach toward each other. When this occurs, a feeling of stress is induced in the occupant of the host vehicle and the occupant of the oncoming vehicle.

The present invention has been devised taking into consideration the aforementioned problem, and has the object of providing a vehicle control device, which is capable of imparting a sense of security to the occupant of the host vehicle and the occupant of the oncoming vehicle.

An aspect of the present invention is characterized by a vehicle control device including:

an external environment recognition unit configured to recognize a condition of a host vehicle lane in which a host vehicle is traveling, and a state of an oncoming lane adjacent to the host vehicle lane, on the basis of information output from an external environment sensor;

a behavior determination unit configured to determine a behavior of a preceding vehicle in the host vehicle lane;

an operation determination unit configured to determine an operation of the host vehicle on the basis of a recognition result of the external environment recognition unit and a determination result of the behavior determination unit; and a vehicle control unit configured to control the host vehicle on the basis of the operation determined by the operation determination unit;

wherein, in the case that the external environment recognition unit recognizes that an obstacle that hinders traveling of the oncoming vehicle exists in the oncoming lane at a more forward position in a direction of progress than the host vehicle, together with recognizing that the preceding vehicle exists at a more forward position in the direction of progress than the obstacle, and in the case that the behavior determination unit determines that the preceding vehicle stops within a predetermined distance from the obstacle, the operation determination unit causes the host vehicle to stop in front of the obstacle.

According to the present invention, when the host vehicle and the oncoming vehicle pass by one another, a sense of security can be imparted to the occupant of the host vehicle and the occupant of the oncoming vehicle.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE PREFERRED EMBODIMENTS

A preferred embodiment of a vehicle control device according to the present invention will be presented and described in detail below with reference to the accompanying drawings.

[1. Overview of Vehicle Control Device 10]

Figure 1:
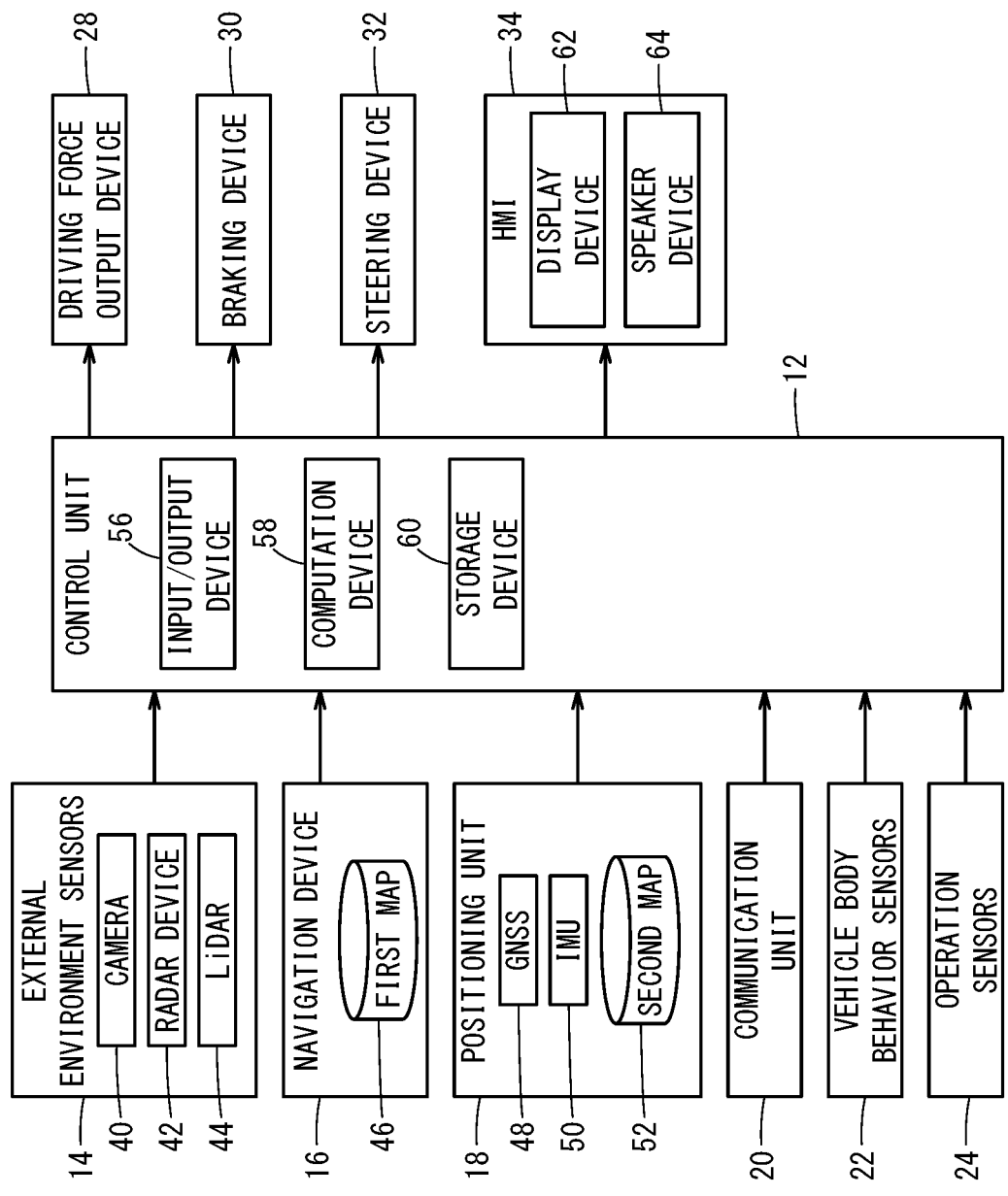
FIG. 1 is a block diagram of a vehicle control device according to a present embodiment.

The vehicle control device 10 shown in FIG. 1 is capable of switching between manual driving in which a travel control (vehicle controls of acceleration, deceleration, and steering) of a host vehicle 90 (FIG. 3) are performed by a vehicle occupant, and automated driving in which at least a portion of the travel control is performed automatically.

[2. Configuration of Vehicle Control Device 10]

The configuration of the vehicle control device 10 will now be described with reference to FIG. 1. The vehicle control device 10 is provided in the host vehicle 90. The vehicle control device 10 includes a control unit 12, an input device group that inputs various information with respect to the control unit 12, and an output device group that operates the host vehicle 90 based on various information output from the control unit 12. Within the input device group, there are included external environment sensors 14, a navigation device 16, a positioning unit 18, a communication unit 20, vehicle body behavior sensors 22, and operation sensors 24. Within the output device group, there are included a driving force output device 28, a braking device 30, a steering device 32, and an HMI 34.

[2.1. Configuration of Input Device Group]

The external environment sensors 14 include one or more cameras 40, one or more radar devices 42, and one or more LiDAR devices 44. The cameras 40 capture images of the surrounding environment of the host vehicle 90, and output image information to the control unit 12. The radar devices 42 and the LiDAR devices 44 detect targets around the periphery of the host vehicle 90, and output detected information to the control unit 12.

The navigation device 16 specifies the position of the host vehicle 90 using a GPS or the like, refers to map information of a first map 46 and generates a travel route from the position of the host vehicle 90 to a destination designated by the vehicle occupant, and outputs travel route information to the control unit 12.

The positioning unit 18 outputs to the control unit 12 position information indicative of the position of the host vehicle 90 specified by a GNSS 48 and an IMU 50, and map information of a second map 52. Moreover, the second map 52 includes more accurate and detailed map information than the first map 46, and includes, for example, information such as the number of lanes included in the roads, positions of the lanes, and widths of the lanes.

The communication unit 20 includes a communication device that receives information broadcast by a broadcasting station, a communication device that receives information transmitted by roadside devices installed along the road, and a communication device that receives information transmitted by vehicles other than the host vehicle 90, and outputs the various information that are received to the control unit 12.

The vehicle body behavior sensors 22 include various sensors that measure the behavior of the host vehicle 90, for example a vehicle speed sensor that detects the travel speed of the host vehicle 90, a yaw rate sensor that detects the yaw rate of the host vehicle 90, and the like. The vehicle body behavior sensors 22 output various detected information to the control unit 12.

The operation sensors 24 include switches or sensors that detect operations performed by the user, for example, an automated driving switch to switch between automated driving and manual driving, a turn signal switch which indicates a flashing direction of the turn signals, an accelerator pedal sensor that detects an amount by which the accelerator pedal is operated, a brake pedal sensor that detects an amount by which the brake pedal is operated, a steering angle sensor that detects a steering angle of the steering wheel, and a contact sensor provided on the steering wheel. The operation sensors 24 output various detected information to the control unit 12.

[2.2. Configuration of Control Unit 12]

The control unit 12 is constituted by an ECU. The control unit 12 includes an input/output device 56, a computation device 58, and a storage device 60. The input/output device 56 includes an A/D conversion circuit, a communication interface, a driver, and the like. The computation device 58 is constituted by a processor equipped with a CPU or the like, for example. The computation device 58 realizes various functions by executing programs stored in the storage device 60. A description will be given in item [2.4] below concerning the various functions of the computation device 58. The storage device 60 is constituted by memories such as a RAM, a ROM, and the like. The storage device 60 stores various programs, and numerical information and the like used in processes performed by the computation device 58.

[2.3. Configuration of Output Device Group]

The driving force output device 28 includes a driving force output ECU and actuators (including a driving motor, a throttle valve, and the like) that serve as control targets of the driving force output ECU. The driving force output device 28 adjusts the driving force in accordance with an operation of the accelerator pedal performed by the vehicle occupant, or instruction information (driving instructions) output from the control unit 12.

The braking device 30 includes a brake ECU, and actuators (including a brake actuator and the like) that serve as control targets of the brake ECU. The braking device 30 adjusts the braking force in accordance with an operation of the brake pedal performed by the vehicle occupant, or instruction information (braking instructions) output from the control unit 12.

The steering device 32 includes an electric power steering (EPS) ECU and an actuator (including an EPS actuator or the like) that is controlled by the EPS ECU. The steering device 32 adjusts the steering amount in accordance with operations of the steering wheel performed by the vehicle occupant, or instruction information (steering instructions) output from the control unit 12.

The HMI 34 includes a display device 62 and a speaker device 64. The display device 62 outputs image information in accordance with instruction information (notification instructions) output from the control unit 12. The display device 62 may be an input device equipped with a touch panel. The speaker device 64 outputs audio information in accordance with instruction information (notification instructions) output from the control unit 12.

[2.4. Various Functions of Computation Device 58]

Figure 2:
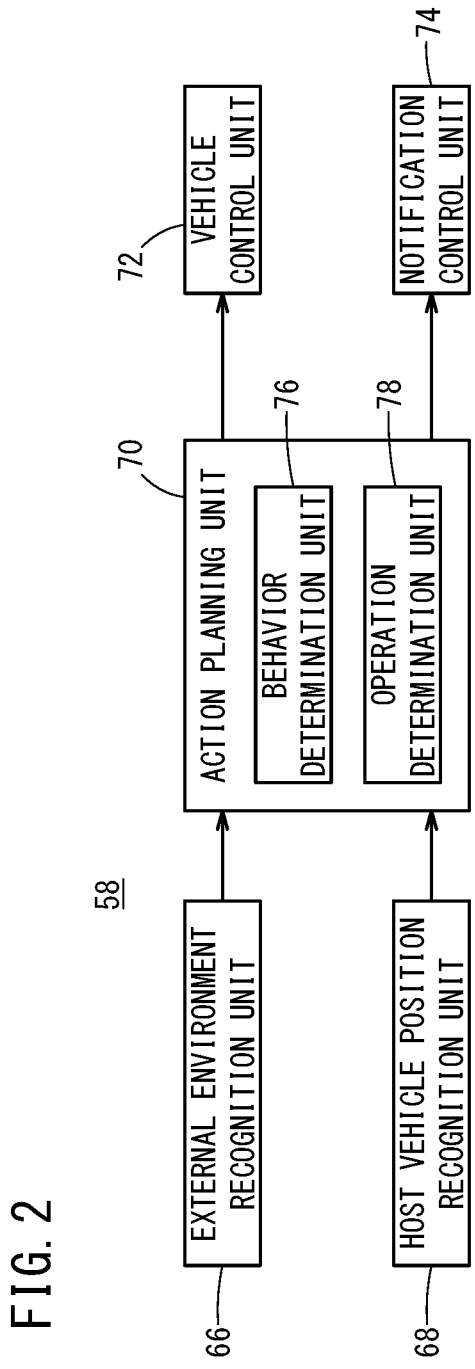
FIG. 2 is a functional block diagram of a computation device.

The various functions realized by the computation device 58 will be described with reference to FIG. 2. The computation device 58 functions as an external environment recognition unit 66, a host vehicle position recognition unit 68, an action planning unit 70, a vehicle control unit 72, and a notification control unit 74.

The external environment recognition unit 66 performs image processing using image information output from the cameras 40, and object recognition using detection information from the radar devices 42 and the LiDAR devices 44, and recognizes a state around the periphery of the host vehicle 90. The host vehicle position recognition unit 68 recognizes the position of the host vehicle 90 on the basis of the position information output from the navigation device 16 or the positioning unit 18, and the map information from at least one of the first map 46 and the second map 52.

The action planning unit 70 generates a local map (dynamic map) which includes static information and dynamic information around the periphery of the host vehicle 90, on the basis of the recognition results of the external environment recognition unit 66 and the host vehicle position recognition unit 68. In addition, the action planning unit 70 determines optimal actions based on the local map and the state (travel speed, steering angle, position) of the host vehicle 90, and calculates a travel speed (acceleration/deceleration) together with generating a travel trajectory in order to realize such actions. According to the present embodiment, the action planning unit 70 functions as a behavior determination unit 76 that determines the behavior of a preceding vehicle 96 (see FIG. 3) that is traveling in the host vehicle lane 100 (see FIG. 3), and an operation determination unit 78 that determines operations of the host vehicle 90 based on the recognition result of the external environment recognition unit 66 and the determination result of the behavior determination unit 76.

The vehicle control unit 72 calculates an acceleration or deceleration in order for the host vehicle 90 to be operated at the travel speed calculated by the action planning unit 70, and a steering angle for causing the host vehicle 90 to travel along the travel trajectory generated by the action planning unit 70. The vehicle control unit 72 outputs instruction information to instruct the acceleration/deceleration and the steering angle to the driving force output device 28, the braking device 30, and the steering device 32 via the input/output device 56.

The notification control unit 74 outputs instruction information indicative of notification content to the HMI 34 via the input/output device 56, in the case that notifications are required in accordance with the actions determined by the action planning unit 70.

[3. Processes Performed by Vehicle Control Device 10]

[3.1. Basic Processes]

Figure 3:
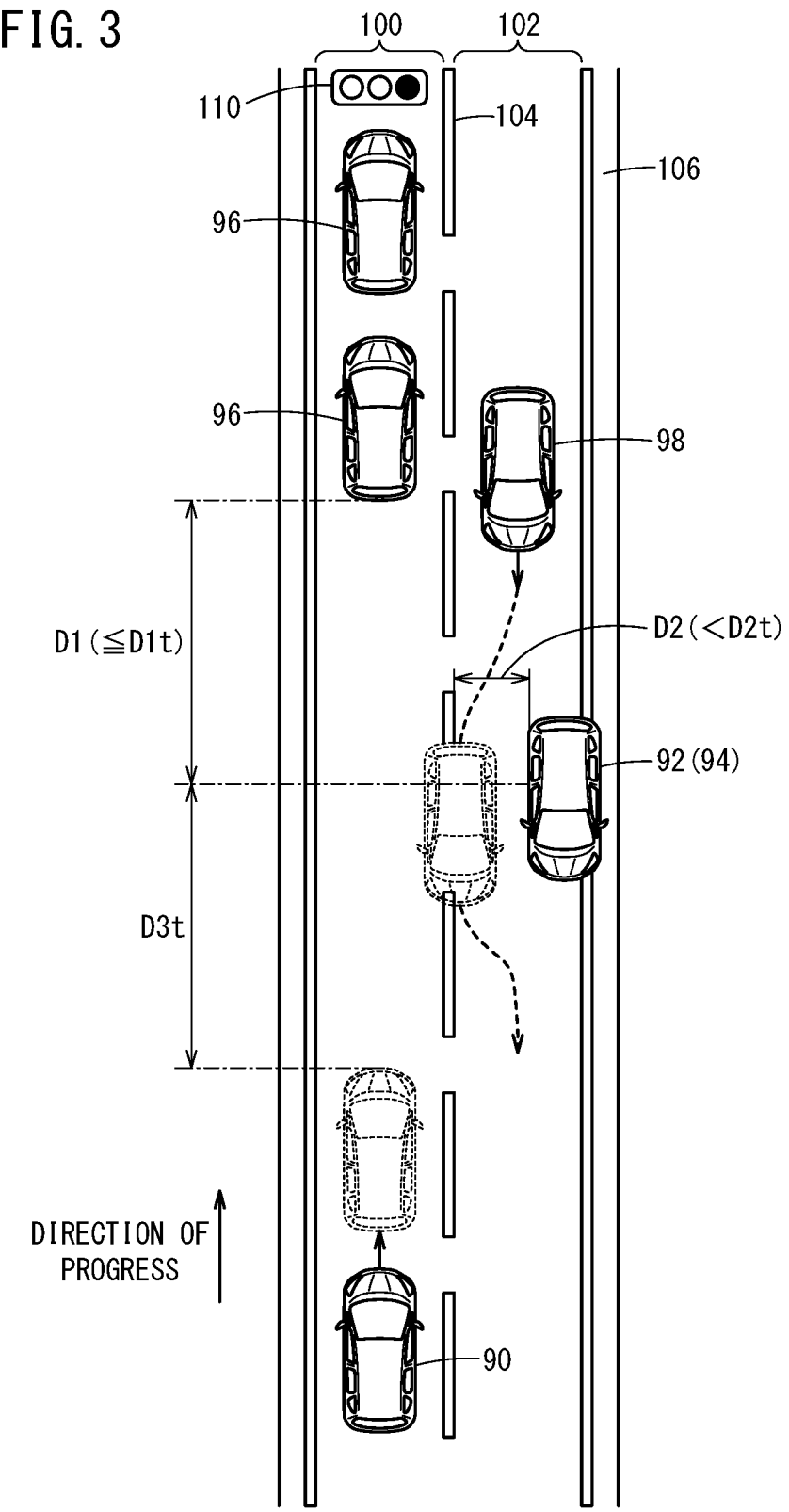
FIG. 3 is a schematic diagram showing a first situation assumed in the present embodiment.

As shown in FIG. 3, in the case that an obstacle 92 that hinders traveling of an oncoming vehicle 98 exists in an oncoming lane 102 (on a side in front of the host vehicle 90) at a more forward position in the direction of progress than the host vehicle 90, and a preceding vehicle 96 exists at a more forward position in the direction of progress than the obstacle 92, and further, in the case that the preceding vehicle 96 is stopping within a first predetermined distance D1$t$ from the obstacle 92, the host vehicle 90 stops in front of (before reaching) the obstacle 92. Moreover, hereinafter, the term "direction of progress" implies a direction of progress of the host vehicle 90, and implies a forward direction with reference to the host vehicle 90.

Using FIG. 4, the basic processes performed by the vehicle control device 10 will be described. The series of processes to be described below are performed at each of predetermined time intervals, in the case that the driving state of the host vehicle 90 is in the automated driving state. Moreover, the external environment sensors 14 acquire various types of information at all times or at each of the predetermined time intervals, and output such information to the control unit 12.

Figure 5:
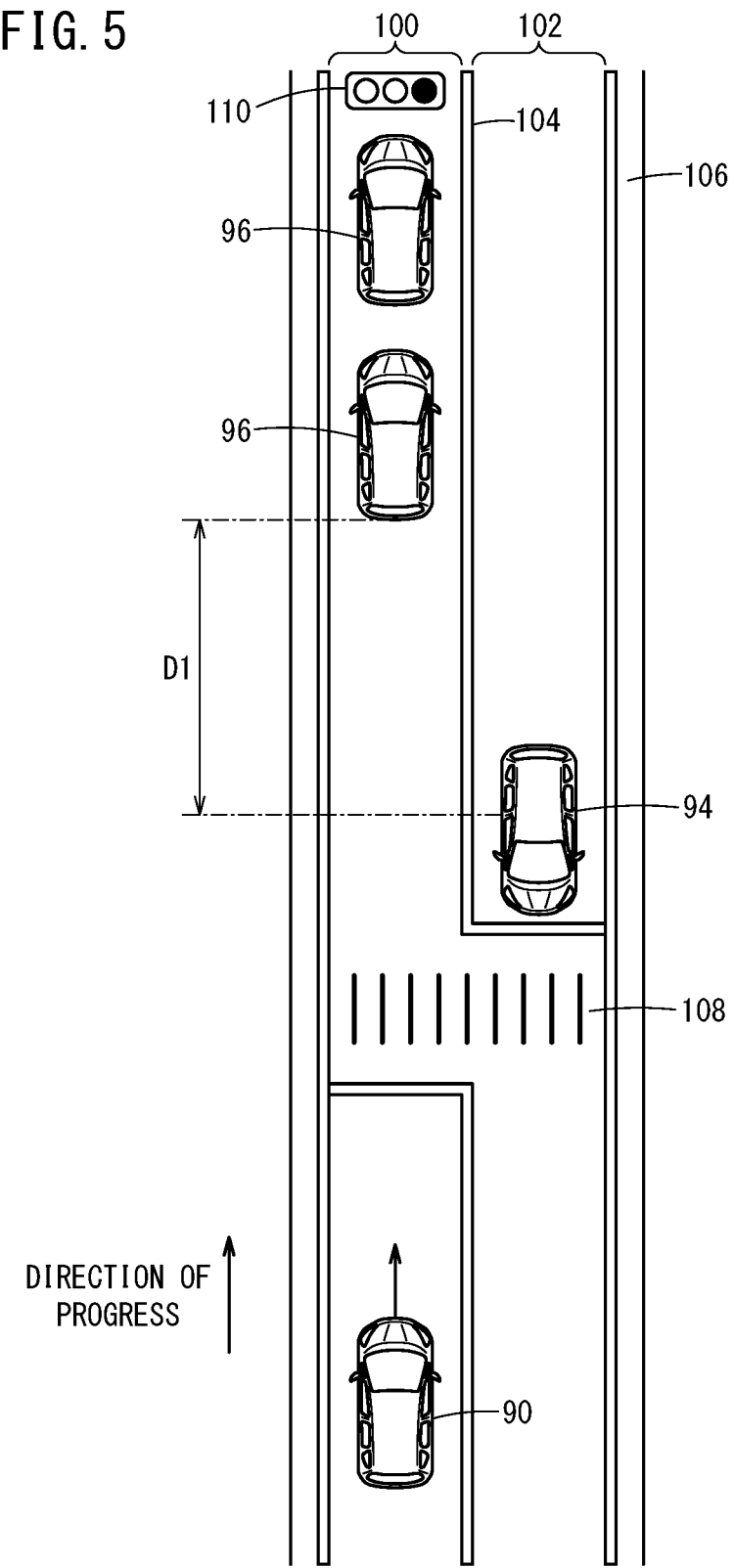
FIG. 5 is a schematic diagram showing a second situation assumed in the present embodiment.

In step S1, the external environment recognition unit 66 determines whether or not an obstacle 92 that hinders traveling of an oncoming vehicle 98 exists in the oncoming lane 102 at a more forward position in the direction of progress than the host vehicle 90. Such an obstacle 92 that hinders traveling of the oncoming vehicle 98 implies an object that is stopped, and has a width greater than or equal to a predetermined width or a height greater than or equal to a predetermined height. The external environment recognition unit 66 recognizes as the obstacle 92 a vehicle that is stopped in the oncoming lane 102 (hereinafter, referred to as a stopped vehicle 94). For example, as illustrated in FIG. 3, the external environment recognition unit 66 recognizes as the obstacle 92 the stopped vehicle 94 that is stopped while straddling over the oncoming lane 102 and the road shoulder 106. The obstacle 92, in addition to a stopped vehicle 94 that is parked on the road, may include a stopped vehicle 94 that stops at the end of the oncoming lane 102 in order to enter into a store, a parking lot, an intersection, or the like. On the other hand, as shown in FIG. 5, in the case of recognizing that the obstacle 92 is the stopped vehicle 94, and furthermore, recognizing a pedestrian crossing 108 in front of the stopped vehicle 94 (on the side of the host vehicle 90), the external environment recognition unit 66 does not recognize the stopped vehicle 94 as the obstacle 92. In the case that the obstacle 92 exists (step S1: YES), the process transitions to step S2. On the other hand, in the case that the obstacle 92 does not exist (step S1: NO), the process transitions to step S7.

In step S2, the external environment recognition unit 66 determines whether or not a preceding vehicle 96 is present in the host vehicle lane 100 at a more forward position in the direction of progress than the host vehicle 90. In the event there is a preceding vehicle 96 (step S2: YES), the process transitions to step S3. On the other hand, in the event that a preceding vehicle 96 does not exist (step S2: NO), the process transitions to step S7.

In step S3, the behavior determination unit 76 determines the behavior of the preceding vehicle 96 on the basis of the recognition result of the external environment recognition unit 66. In this instance, the behavior determination unit 76 determines whether the preceding vehicle 96 stops (whether the preceding vehicle is in a stopped state or a state in which the vehicle is expected to stop), and further, in the case of being determined to stop, determines (or predicts) the stopping position.

In the case that the external environment recognition unit 66 recognizes the preceding vehicle 96 which has already stopped, for example, in the case that the travel speed of the preceding vehicle 96 is zero, the behavior determination unit 76 determines that the preceding vehicle 96 is stopped. The behavior determination unit 76 determines the current position of the preceding vehicle 96 as the stopping position.

In the case that the external environment recognition unit 66 recognizes that the preceding vehicle 96 is immediately prior to stopping, for example, in the case that the travel speed of the preceding vehicle 96 is less than or equal to a predetermined speed and the brake lamp is illuminated, the behavior determination unit 76 determines (or predicts) that the preceding vehicle 96 will stop. At this time, the behavior determination unit 76 determines (or predicts) the stopping position based on the deceleration of the preceding vehicle 96.

Alternatively, in the case that the external environment recognition unit 66 recognizes a traffic signal 110 within a predetermined range in the direction of progress of the host vehicle 90, and further recognizes that the traffic signal is displaying a stop instruction, the behavior determination unit 76 determines (or predicts) that the preceding vehicle 96 will stop. On the basis of the first map 46 or the second map 52, the external environment recognition unit 66 recognizes the distance from the host vehicle 90 to the traffic signal 110, and recognizes the traffic signal on the basis of the image information acquired by the cameras 40 or signal information acquired by the communication unit 20. At this time, the behavior determination unit 76 determines (or predicts) the stopping position based on the deceleration of the preceding vehicle 96.

Alternatively, in the case that the external environment recognition unit 66 recognizes that traffic congestion is occurring in the host vehicle lane 100 at a more forward position in the direction of progress than the host vehicle 90, the behavior determination unit 76 determines (or predicts) that the preceding vehicle 96 will stop. The external environment recognition unit 66 recognizes that traffic congestion is occurring on the basis of the image information acquired by the cameras 40 or traffic information acquired by the communication unit 20. At this time, the behavior determination unit 76 determines (or predicts) the stopping position based on the deceleration of the preceding vehicle 96.

In step S4, the behavior determination unit 76 determines whether a preceding vehicle 96 is stopping within the first predetermined distance D1$t$ from the obstacle 92. The behavior determination unit 76 calculates a first distance D1 between the position of the obstacle 92 recognized in step S1 and the stopping position of the preceding vehicle 96 that was determined in step S3. As shown in FIG. 3, the first distance D1 is defined as a distance between a position of a predetermined portion of the obstacle 92 (the center of the vehicle in the drawing) and a predetermined portion of the preceding vehicle 96 (a rear end of the vehicle in the drawing), which are plotted on a line segment parallel to the direction of progress. Additionally, the behavior determination unit 76 compares the calculated first distance D1 with the first predetermined distance D1$t$. The first predetermined distance D1$t$ is set in advance as a lower limit value of a distance through which the oncoming vehicle 98 is capable of passing with a certain amount of leeway between the preceding vehicle 96 and the obstacle 92, and is stored in the storage device 60. In the case that the first distance D1≤the first predetermined distance D1$t$, and more specifically, if the preceding vehicle 96 is stopping within the first predetermined distance D1$t$ from the obstacle 92 (step S4: YES), the process transitions to step S5. On the other hand, in the case that the first distance D1>the first predetermined distance D1$t$, and more specifically, if the preceding vehicle 96 is not stopping within the first predetermined distance D1$t$ from the obstacle 92 (step S4: NO), the process transitions to step S7.

In step S5, the external environment recognition unit 66 recognizes a second distance D2 between the obstacle 92 and a center line 104 that separates the host vehicle lane 100 and the oncoming lane 102. Additionally, on the basis of the recognition result of the external environment recognition unit 66, the operation determination unit 78 determines whether or not the second distance D2 is less than a second predetermined distance D2$t$ (i.e., whether D2<D2$t$). The second predetermined distance D2$t$ is set in advance as a lower limit value of a distance through which the oncoming vehicle 98 is capable of passing by the obstacle 92 without straddling over the center line 104, and is stored in the storage device 60. In the case that the second distance D2<the second predetermined distance D2$t$ (step S5: YES), the process transitions to step S6. On the other hand, in the case that the second distance D2 the second predetermined distance D2$t$ (step S5: NO), the process transitions to step S7.

In step S6, the operation determination unit 78 sets the stopping position of the host vehicle 90 at a location away from the position of the obstacle 92 that was recognized in step S1 by a third predetermined distance D3$t$ in a direction opposite to the direction of progress, and sets a travel trajectory up to the stopping position. The third predetermined distance D3$t$ is set in advance as a lower limit value of a distance through which the oncoming vehicle 98 is capable of passing with a certain amount of leeway between the host vehicle 90 and the obstacle 92, and is stored in the storage device 60. The vehicle control unit 72 calculates various operation amounts in order to realize the vehicle operations determined by the operation determination unit 78, and more specifically, operations to cause the host vehicle 90 to stop at the set stopping position. The vehicle control unit 72 outputs instruction information to the driving force output device 28, the braking device 30, and the steering device 32, and causes the host vehicle 90 to stop in front of (before reaching) the obstacle 92.

Figure 6:
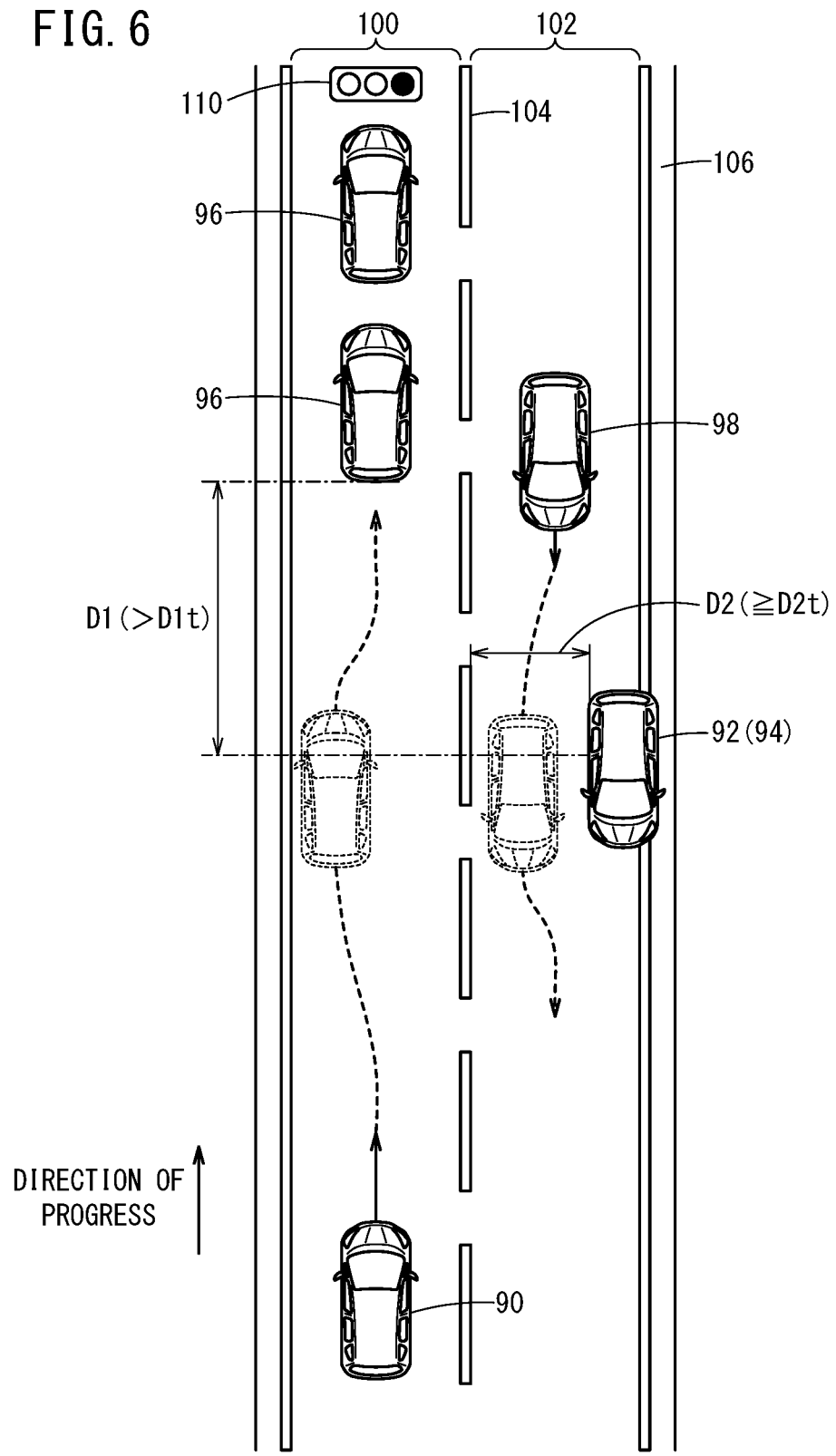
FIG. 6 is a schematic diagram showing a third situation assumed in the present embodiment.

When the process transitions to step S7 from step S1, step S2, step S4, and step S5, as shown in FIG. 6, the operation determination unit 78 sets the travel speed and the travel trajectory in order to cause the host vehicle 90 to travel in a direction away from the oncoming lane 102 (i.e., travel on a side that is distant from the oncoming lane 102). The vehicle control unit 72 calculates various operation amounts in order to realize the vehicle operations determined by the operation determination unit 78. The vehicle control unit 72 outputs operation instructions to the driving force output device 28, the braking device 30, and the steering device 32, and causes the host vehicle 90 to travel.

[3.2. Additional Processes]

Figure 7:
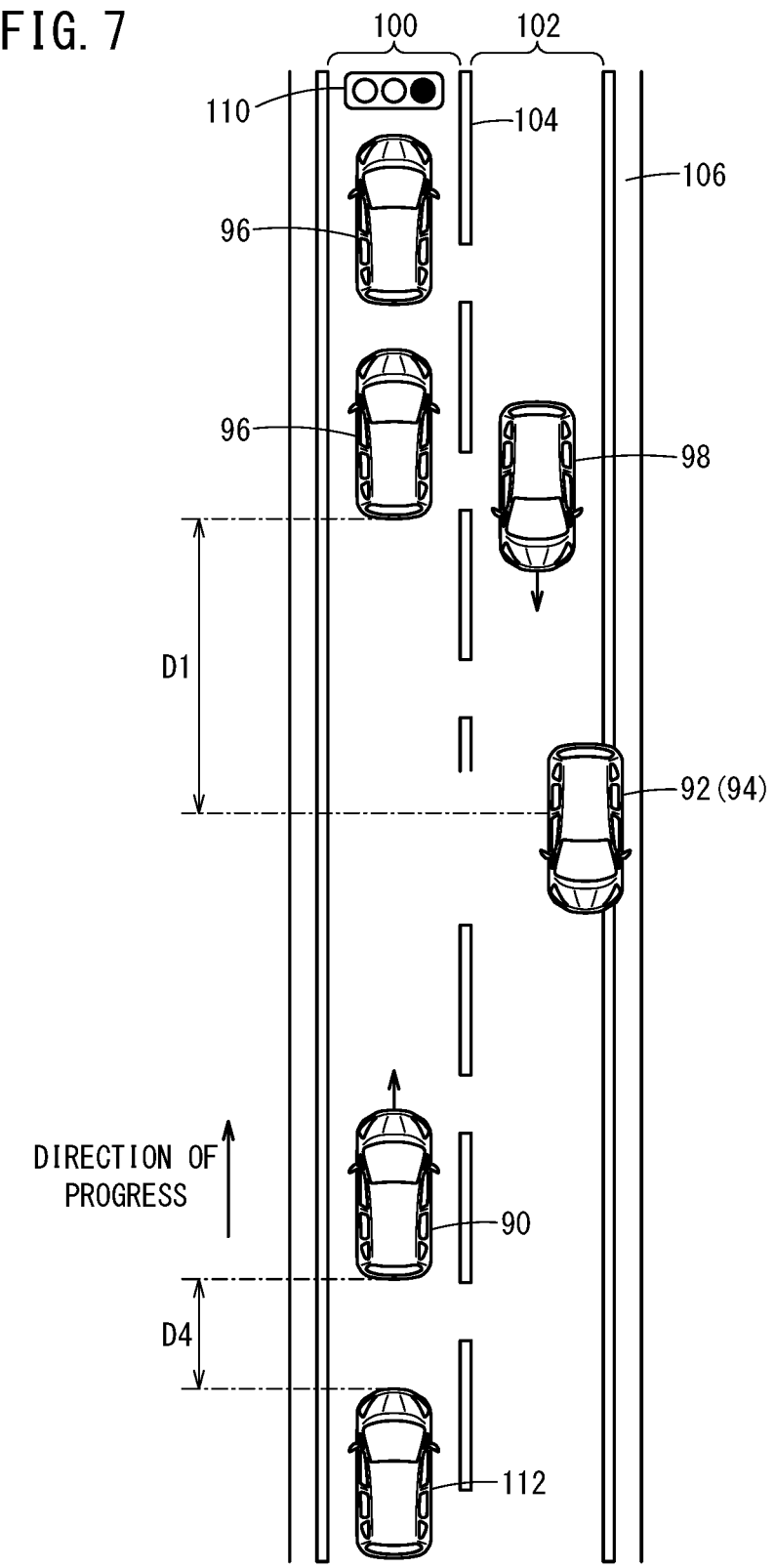
FIG. 7 is a schematic diagram showing a fourth situation assumed in the present embodiment.

As shown in FIG. 7, in the case that a following vehicle 112 travels in the host vehicle lane 100 in a more opposite direction to the direction of progress than the host vehicle 90 (i.e., rearwardly of the host vehicle 90), the determination condition for determining whether to cause the host vehicle 90 to stop may be changed depending on the number of the following vehicles 112. An example thereof will be described with reference to FIG. 8. In this instance, as an example of changing the determination condition, an embodiment will be described in which the first predetermined distance D1$t$ is changed. The process described below is performed prior to performing the process of step S4 of FIG. 4.

In step S11, the external environment recognition unit 66 recognizes the following vehicles 112 and the number thereof. In the case that the number of the following vehicles 112 is greater than zero, or stated otherwise, if a following vehicle 112 is determined to exist (step S11: YES), the process transitions to step S12. On the other hand, in the case that the number of the following vehicles 112 is zero, or stated otherwise, if a following vehicle 112 does not exist (step S11: NO), the process transitions to step S14.

In step S12, the external environment recognition unit 66 recognizes an inter-vehicle distance D4 between the host vehicle 90 and a leading one of the following vehicles 112. In addition, the external environment recognition unit 66 compares the inter-vehicle distance D4 with a predetermined inter-vehicle distance D4$t$. The predetermined inter-vehicle distance D4$t$ is set in advance and is stored in the storage device 60. In the case that the inter-vehicle distance D4 is less than the predetermined inter-vehicle distance D4$t$ (step S12: YES), the process transitions to step S13. On the other hand, in the case that the inter-vehicle distance D4 is greater than or equal to the predetermined inter-vehicle distance D4$t$ (step S12: NO), the process transitions to step S14.

In step S13, the behavior determination unit 76 changes the first predetermined distance D1$t$ in accordance with the number of the following vehicles 112. In this instance, the behavior determination unit 76 changes the first predetermined distance D1$t$ to a second changed distance, which is made greater than the initial value (the value stored in the storage device 60) as the number of the following vehicles 112 increases.

Upon transitioning from step S11 and step S12 to step S14, the behavior determination unit 76 maintains the first predetermined distance D1$t$. In this instance, the behavior determination unit 76 sets the first predetermined distance D1$t$ to the initial value (the value stored in the storage device 60). The initial value is referred to as a first changed distance. The first changed distance and the second changed distance can be set arbitrarily.

[4. Other Examples]

Figure 4:
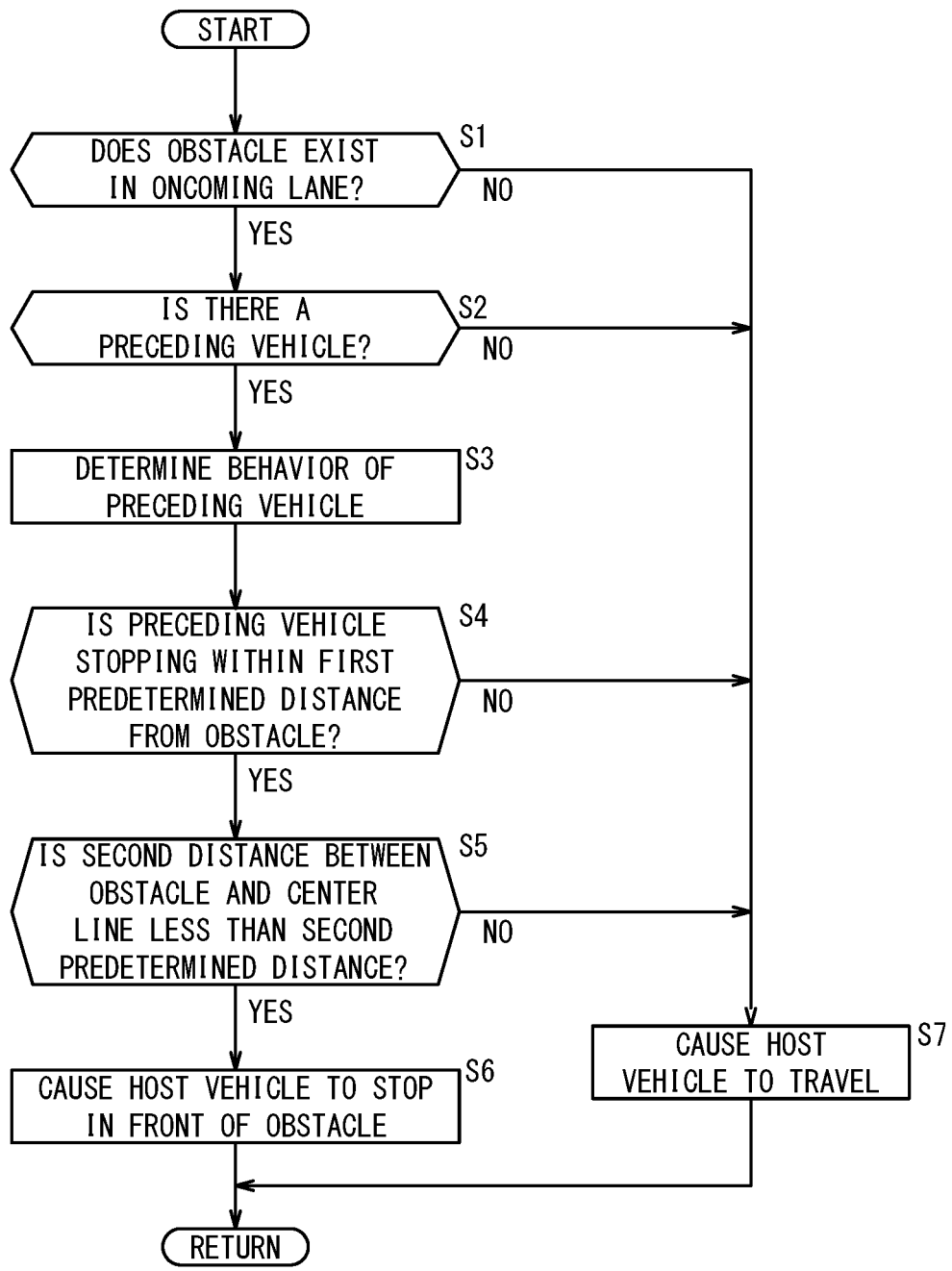
FIG. 4 is a flowchart showing a flow of basic processes performed by the vehicle control device.
Figure 8:
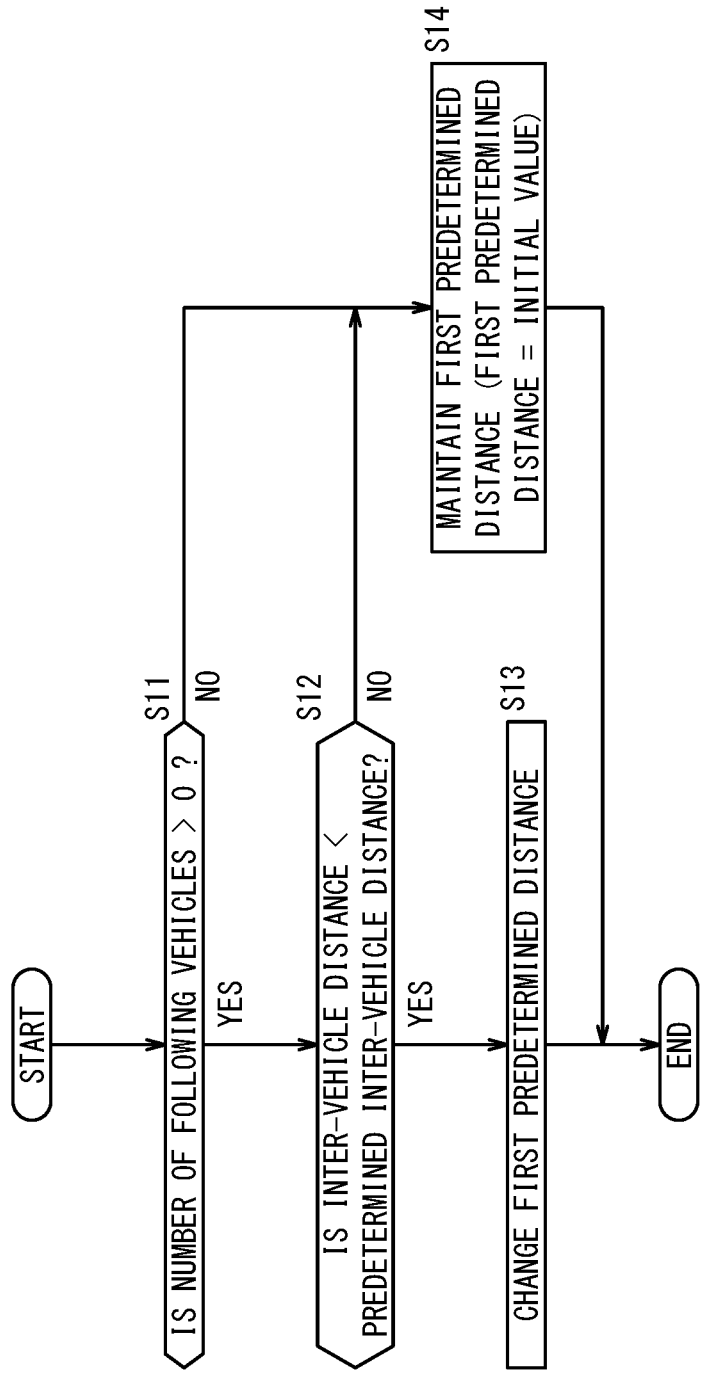
FIG. 8 is a flowchart showing a flow of additional processes performed by the vehicle control device.

The process in step S5 of FIG. 4 and the process in step S12 of FIG. 8 are not essential. Further, in the process of step S11 in FIG. 8, zero is set as a determination number for the number of the following vehicles 112, however, a determination number other than zero may also be set.

[5. Technical Concepts Obtained from the Embodiments]

A description will be given below concerning technical concepts that can be grasped from the above-described embodiments and the modified examples.

An aspect of the present invention is characterized by the vehicle control device including:

the external environment recognition unit 66 configured to recognize the condition of the host vehicle lane 100 in which the host vehicle 90 is traveling, and the state of the oncoming lane 102 adjacent to the host vehicle lane 100, on the basis of information output from the external environment sensors 14;

the behavior determination unit 76 configured to determine the behavior of the preceding vehicle 96 in the host vehicle lane 100;

the operation determination unit 78 configured to determine an operation of the host vehicle 90 on the basis of the recognition result of the external environment recognition unit 66 and the determination result of the behavior determination unit 76; and the vehicle control unit 72 configured to control the host vehicle 90 on the basis of the operation determined by the operation determination unit 78;

wherein, in the case that the external environment recognition unit 66 recognizes that the obstacle 92 that hinders traveling of the oncoming vehicle 98 exists in the oncoming lane 102 at a more forward position in the direction of progress than the host vehicle 90, together with recognizing that the preceding vehicle 96 exists at a more forward position in the direction of progress than the obstacle 92, and in the case that the behavior determination unit 76 determines that the preceding vehicle 96 stops within a predetermined distance (the first predetermined distance D1$t$) from the obstacle 92, the operation determination unit 78 causes the host vehicle 90 to stop in front of the obstacle 92.

In accordance with the above-described configuration, under a condition in which the obstacle 92 exists in the oncoming lane 102 at a more forward position in the direction of progress than the host vehicle 90, the preceding vehicle 96 exists at a more forward position in the direction of progress than the obstacle 92, and the preceding vehicle 96 is stopping within the predetermined distance (first predetermined distance D1$t$) from the obstacle 92, the host vehicle 90 is stopped in front of the obstacle 92. Therefore, the host vehicle 90 is prevented from approaching toward the obstacle 92 and stopping at the position of the obstacle 92 or at a position beyond the obstacle 92. Thus, when the oncoming vehicle 98 travels while avoiding the obstacle 92, the host vehicle 90 does not obstruct traveling of the oncoming vehicle 98, and the host vehicle 90 and the oncoming vehicle 98 are prevented from coming into close proximity to each other. Accordingly, when the host vehicle 90 and the oncoming vehicle 98 pass by one another, a sense of security can be imparted to the occupant of the host vehicle 90 and the occupant of the oncoming vehicle 98.

In the aspect of the present invention, in the case that the host vehicle lane 100 is congested at a more forward position in the direction of progress than the host vehicle 90, the behavior determination unit 76 may determine that the preceding vehicle 96 stops within the predetermined distance (first predetermined distance D1$t$) from the obstacle 92 (step S3 of FIG. 4).

In accordance with the above-described configuration, it is possible to appropriately determine whether or not the preceding vehicle 96 stops.

In the aspect of the present invention, in the case that a traffic signal 110 of the host vehicle lane 100 at a more forward position in the direction of progress than the host vehicle 90 is displaying a stop instruction, the behavior determination unit 76 may determine that the preceding vehicle 96 stops within the predetermined distance (first predetermined distance D1$t$) from the obstacle 92 (step S3 of FIG. 4).

In accordance with the above-described configuration, it is possible to appropriately determine whether or not the preceding vehicle 96 stops.

In the aspect of the present invention:

another predetermined distance (the second predetermined distance D2$t$) may be set separately from the predetermined distance (first predetermined distance D1$t$); and in the case that the external environment recognition unit 66 recognizes that a distance (second distance D2) between the obstacle 92 and the center line 104 that separates the host vehicle lane 100 and the oncoming lane 102 is less than the other predetermined distance (second predetermined distance D2$t$), the operation determination unit 78 may cause the host vehicle 90 to stop in front of the obstacle 92 (step S5 of FIG. 4: YES, step S6).

According to the above-described configuration, it is possible to appropriately determine a possibility as to whether the host vehicle 90 and the oncoming vehicle 98 will come into proximity to each other, and to cause the host vehicle 90 to stop in the case that such a possibility is high.

In the aspect of the present invention:

in the case that the external environment recognition unit 66 recognizes that the distance (second distance D2) between the obstacle 92 and the center line 104 is greater than the other predetermined distance (second predetermined distance D2$t$), the operation determination unit 78 may cause the host vehicle 90 to travel in a direction away from the oncoming lane 102 (step S5 of FIG. 4: NO, step S7).

In accordance with the above-described configuration, it is possible to appropriately determine a possibility as to whether the host vehicle 90 and the oncoming vehicle 98 will come into proximity to each other, and to allow the host vehicle 90 to travel without stopping in the case that such a possibility is low. Further, even if the oncoming vehicle 98 tentatively enters more than necessary into the host vehicle lane 100, it is possible to prevent the host vehicle 90 and the oncoming vehicle 98 from excessively coming into proximity to one another.

In the aspect of the present invention, in the case of recognizing the stopped vehicle 94 that is stopped in the oncoming lane 102 and also recognizing the pedestrian crossing 108 in front of the stopped vehicle 94, the external environment recognition unit 66 may not recognize the stopped vehicle 94 as the obstacle 92 (step S1 of FIG. 4: NO).

Normally, a stopped vehicle 94 that is simply stopped in front of the pedestrian crossing 108 does not hinder traveling of the oncoming vehicle 98. In accordance with the above-described configuration, since such a stopped vehicle 94 is not recognized as the obstacle 92, it is prevented that the host vehicle 90 will be stopped any more than necessary.

In the aspect of the present invention, the external environment recognition unit 66 may recognize as the obstacle 92 a stopped vehicle 94 that is stopped while straddling over the oncoming lane 102 and the road shoulder 106 (step S1 of FIG. 4: YES).

In accordance with the above-described configuration, determination of the obstacle 92 can be appropriately carried out.

In the aspect of the present invention:
the external environment recognition unit 66 may recognize a following vehicle 112 that is traveling in the host vehicle lane 100 on a more opposite side in the direction of progress than the host vehicle 90; and
a determination condition of whether or not to cause the host vehicle 90 to stop may be changed depending on the presence or absence of the following vehicle 112 as recognized by the external environment recognition unit 66 (FIG. 8).

In accordance with the above-described configuration, by stopping the host vehicle 90 in front of the obstacle 92, it is possible to prevent the following vehicle 112 from stopping in the vicinity of the obstacle 92 and coming into proximity to the oncoming vehicle 98.

In the aspect of the present invention:
the determination condition is the predetermined distance (first predetermined distance D1$t$); and
the behavior determination unit 76 may set the predetermined distance (first predetermined distance D1$t$) to a first changed distance (initial value) in the case that the number of the following vehicles 112 is zero, and may set the predetermined distance (first predetermined distance D1$t$) to a second changed distance that is larger than the first changed distance in the case that the number of the following vehicles 112 is greater than or equal to one (step S11 of FIG. 8).

In accordance with the above-described configuration, since it becomes easier for the host vehicle 90 to perform the stop control in the case that a following vehicle 112 is present, it is possible to prevent in advance a situation in which the following vehicle 112 stops in the vicinity of the obstacle 92.

In the aspect of the present invention, the behavior determination unit 76 may increase the predetermined distance (first predetermined distance D1$t$) as the number of the following vehicles 112 increases (step S13 of FIG. 8).

In accordance with the above-described configuration, since it becomes easier for the host vehicle 90 to perform the stop control as the number of the following vehicles 112 becomes greater, it is possible to prevent in advance a situation in which the following vehicle 112 stops in the vicinity of the obstacle 92.

In the aspect of the present invention:
the behavior determination unit 76 changes the determination condition in the case that the external environment recognition unit 66 recognizes that the inter-vehicle distance D4 between a leading one of the following vehicles 112 and the host vehicle 90 is less than the predetermined inter-vehicle distance D4$t$; and
the behavior determination unit 76 maintains the determination condition in the case that the external environment recognition unit 66 recognizes that the inter-vehicle distance D4 is greater than the predetermined inter-vehicle distance D4$t$ (step S12 of FIG. 8: NO, step S14).

In the case that the inter-vehicle distance D4 between the host vehicle 90 and the following vehicle 112 is large, there is a high possibility that the following vehicle 112 can confirm that the position where the host vehicle 90 stops due to traffic congestion or the like is in front of the obstacle 92. Therefore, the following vehicle 112 can voluntarily stop in front of (before reaching) the obstacle 92.

The vehicle control device according to the present invention is not limited to the above-described embodiment, and it goes without saying that various additional or alternative configurations could be adopted therein without departing from the essence and gist of the present invention.

What is claimed is:

1. A vehicle control device comprising:
an external environment recognition unit configured to recognize a condition of a host vehicle lane in which a host vehicle is traveling, and a state of an oncoming lane adjacent to the host vehicle lane, based on information output from an external environment sensor;
a behavior determination unit configured to determine a behavior of a preceding vehicle in the host vehicle lane;
an operation determination unit configured to determine an operation of the host vehicle, based on a recognition result of the external environment recognition unit and a determination result of the behavior determination unit; and
a vehicle control unit configured to control the host vehicle, based on the operation determined by the operation determination unit;
wherein, in a case that the external environment recognition unit recognizes that an obstacle that hinders traveling of an oncoming vehicle exists in the oncoming lane at a more forward position in a direction of progress than the host vehicle, together with recognizing that the preceding vehicle exists at a more forward position in the direction of progress than the obstacle, and in a case that the behavior determination unit determines that the preceding vehicle stops within a predetermined distance from the obstacle,
the operation determination unit causes the host vehicle to stop in front of the obstacle.

2. The vehicle control device according to claim 1, wherein, in a case that the host vehicle lane is congested at a more forward position in the direction of progress than the host vehicle, the behavior determination unit determines that the preceding vehicle stops within the predetermined distance from the obstacle.

3. The vehicle control device according to claim 1, wherein, in a case that a traffic signal of the host vehicle lane at a more forward position in the direction of progress than the host vehicle is displaying a stop instruction, the behavior determination unit determines that the preceding vehicle stops within the predetermined distance from the obstacle.

4. The vehicle control device according to claim 1, wherein:
another predetermined distance is set separately from the predetermined distance; and
in a case that the external environment recognition unit recognizes that a distance between the obstacle and a center line that separates the host vehicle lane and the oncoming lane is less than the other predetermined distance,
the operation determination unit causes the host vehicle to stop in front of the obstacle.

5. The vehicle control device according to claim 4, wherein:
in a case that the external environment recognition unit recognizes that the distance between the obstacle and the center line is greater than the other predetermined distance, the operation determination unit causes the host vehicle to travel in a direction away from the oncoming lane.

6. The vehicle control device according to claim 1, wherein, in a case of recognizing a stopped vehicle that is stopped in the oncoming lane and also recognizing a pedestrian crossing in front of the stopped vehicle, the external environment recognition unit does not recognize the stopped vehicle as the obstacle.

7. The vehicle control device according to claim 1, wherein the external environment recognition unit recognizes as the obstacle a stopped vehicle that is stopped while straddling over the oncoming lane and a road shoulder.

8. The vehicle control device according to claim 1, wherein:
the external environment recognition unit recognizes a following vehicle traveling in the host vehicle lane on a more opposite side in the direction of progress than the host vehicle; and
a determination condition of whether or not to cause the host vehicle to stop is changed depending on presence or absence of the following vehicle as recognized by the external environment recognition unit.

9. The vehicle control device according to claim 8, wherein:
the determination condition is the predetermined distance; and
the behavior determination unit sets the predetermined distance to a first changed distance in a case that a number of the following vehicles is zero, and sets the predetermined distance to a second changed distance that is larger than the first changed distance in a case that the number of the following vehicles is greater than or equal to one.

10. The vehicle control device according to claim 9, wherein the behavior determination unit increases the predetermined distance as the number of the following vehicles increases.

11. The vehicle control device according to claim 8, wherein:
the behavior determination unit changes the determination condition in a case that the external environment recognition unit recognizes that an inter-vehicle distance between a leading following vehicle and the host vehicle is less than a predetermined inter-vehicle distance; and
the behavior determination unit maintains the determination condition in a case that the external environment recognition unit recognizes that the inter-vehicle distance is greater than the predetermined inter-vehicle distance.

* * * * *